(12) United States Patent
Sorg et al.

(10) Patent No.: US 10,125,041 B2
(45) Date of Patent: Nov. 13, 2018

(54) GLASS MELTING PLANT

(71) Applicant: Beteiligungen Sorg GmbH & Co. KG, Lohr am Main (DE)

(72) Inventors: Alexander Sorg, Aschaffenburg (DE); Matthias Lindig, Ingelheim (DE)

(73) Assignee: BETEILIGUNGEN SORG GMBH & CO. KG, Lohr am Main (DE)

( * ) Notice: Subject to any disclaimer, the term of this patent is extended or adjusted under 35 U.S.C. 154(b) by 0 days.

(21) Appl. No.: 15/138,795

(22) Filed: Apr. 26, 2016

(65) Prior Publication Data
US 2016/0311715 A1    Oct. 27, 2016

(30) Foreign Application Priority Data

Apr. 27, 2015  (DE) .................. 10 2015 106 455
May 22, 2015  (DE) .................. 10 2015 108 195

(51) Int. Cl.
*C03B 3/00*  (2006.01)
*C03B 5/027*  (2006.01)
(Continued)

(52) U.S. Cl.
CPC .................. *C03B 5/04* (2013.01); *C03B 5/02* (2013.01); *C03B 5/185* (2013.01); *Y02P 40/57* (2015.11)

(58) Field of Classification Search
CPC .. C03B 5/03; C03B 5/031; C03B 5/04; C03B 5/182; C03B 5/185; C03B 5/20;
(Continued)

(56) References Cited

U.S. PATENT DOCUMENTS 2,397,852 A * 4/1946 Gentil .................. C03B 5/03
                                                373/33
3,248,205 A    4/1966 Dolf Hans et al.
(Continued)

FOREIGN PATENT DOCUMENTS

DE            806810       6/1951
DE        102010020176    11/2011
WO         2011015994      2/2011

OTHER PUBLICATIONS

European Search Report, dated Sep. 12, 2016, Priority Document.
"Large End-Fired Furnaces with a Melting Area of 100 M2 and More 1", Pieper H., Mar. 1, 1994.

*Primary Examiner* — Hung D Nguyen
(74) *Attorney, Agent, or Firm* — Greer, Burns, & Crain, Ltd.

(57) ABSTRACT

A glass melting plant having a melting tank having end-fired heating, the melting tank having a feeding material inlet, an outlet for removing the molten glass, and a melt surface of at least 40 m². At least one doghouse is laterally situated and is connected to the melting tank inlet for feeding material input. The doghouse has side walls that, together with the melting tank inlet, limit a feeding surface area, and has a feeding device. The doghouse has a roof with an end wall oriented toward the feeding device, which end wall encloses, with the roof, a gas compartment open toward the melting tank. To increase the specific melting performance with at least equal glass quality, the feeding surface of the doghouse is at least 8 m² and, given a melt surface of at least 115 m², is at least 7% of the melting tank melt surface.

20 Claims, 7 Drawing Sheets

(51) Int. Cl.
*C03B 5/04* (2006.01)
*C03B 5/02* (2006.01)
*C03B 5/185* (2006.01)

(58) Field of Classification Search
CPC ........... C03B 5/23; C03B 5/237; C03B 5/187;
C03B 5/193; C03B 5/225; C03B 5/173;
C03B 5/43; C03B 5/24; C03B 3/00;
C03B 3/023; C03B 3/02; C03B 5/02;
Y02P 40/53; Y02P 40/535; Y02P 40/55;
Y02P 40/57
USPC ........ 373/27, 29, 30, 31, 32, 33, 34, 35, 41;
65/135.9, 136.1, 335, 540, 26.16, 136.2,
65/136.3, 482
See application file for complete search history.

(56) References Cited

U.S. PATENT DOCUMENTS

| | | | |
|---|---|---|---|
| 3,941,577 A * | 3/1976 | Schwenninger | C03B 5/03 65/135.7 |
| 4,001,001 A * | 1/1977 | Knavish | C03B 5/235 65/136.2 |
| 5,655,464 A | 8/1997 | Moreau et al. | |
| 2010/0257899 A1 * | 10/2010 | Beaudoin | C03B 5/2353 65/33.9 |
| 2012/0167632 A1 | 7/2012 | Kuhn | |
| 2013/0114638 A1 | 5/2013 | Lindig et al. | |
| 2014/0090423 A1 * | 4/2014 | Charbonneau | C03B 5/04 65/134.5 |

* cited by examiner

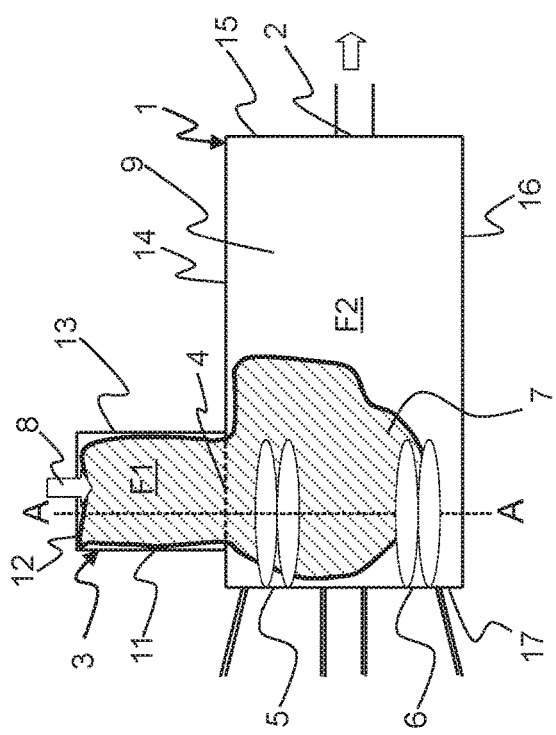
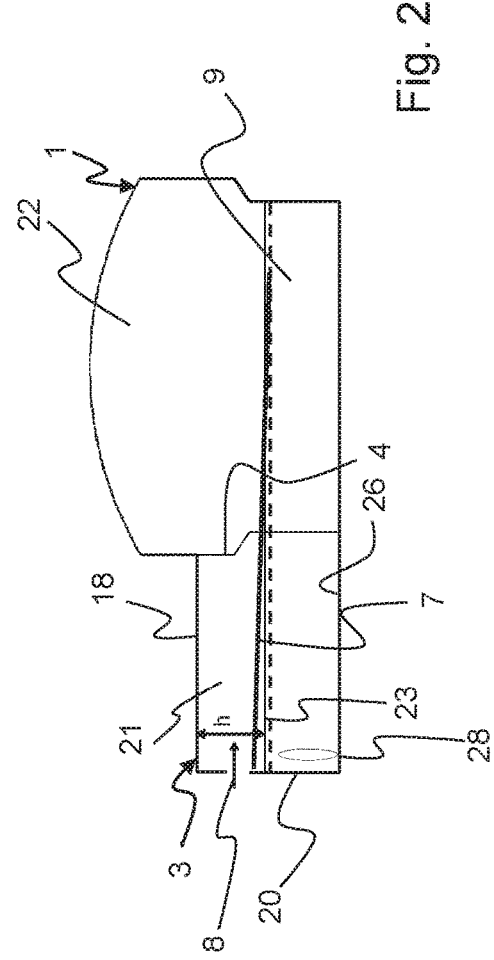

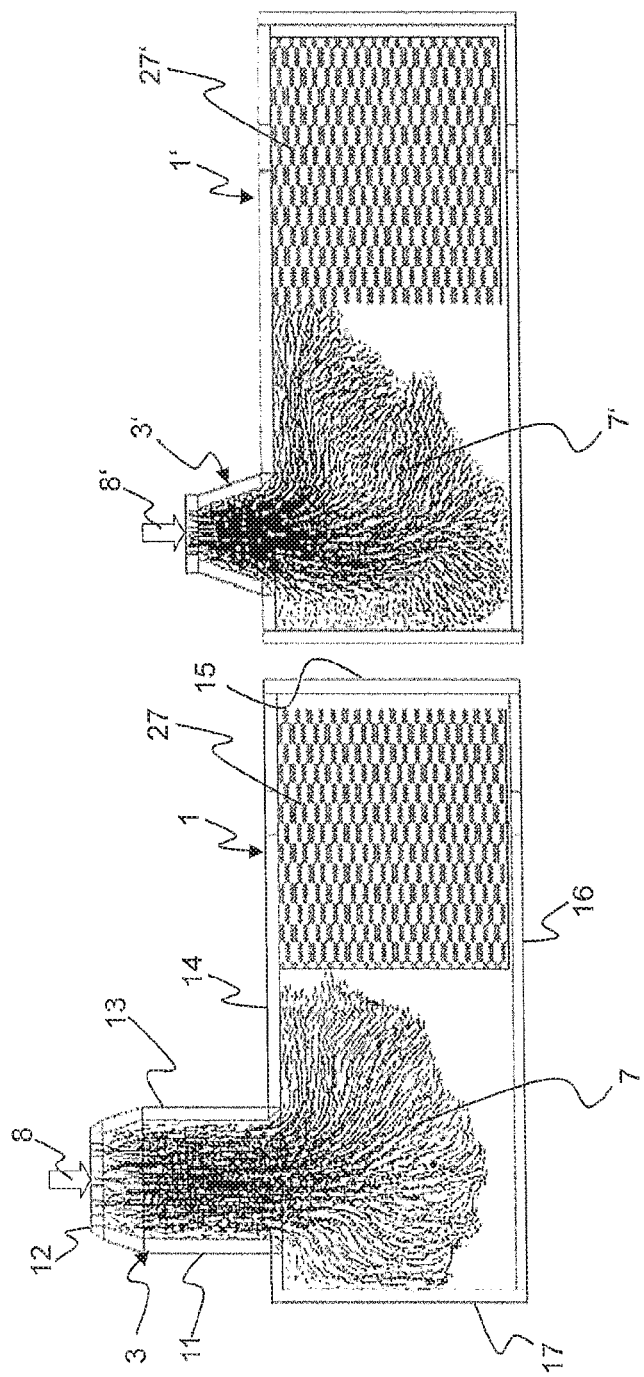

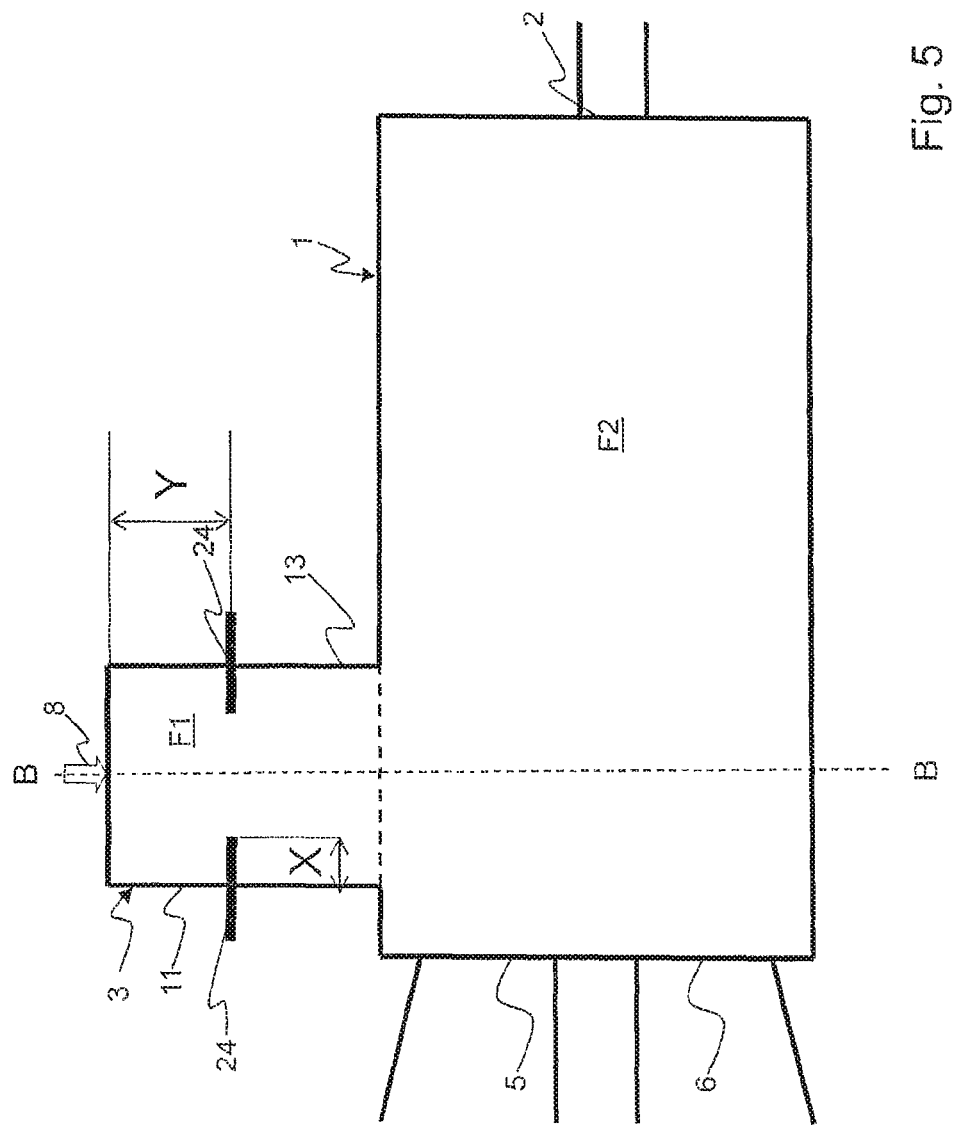

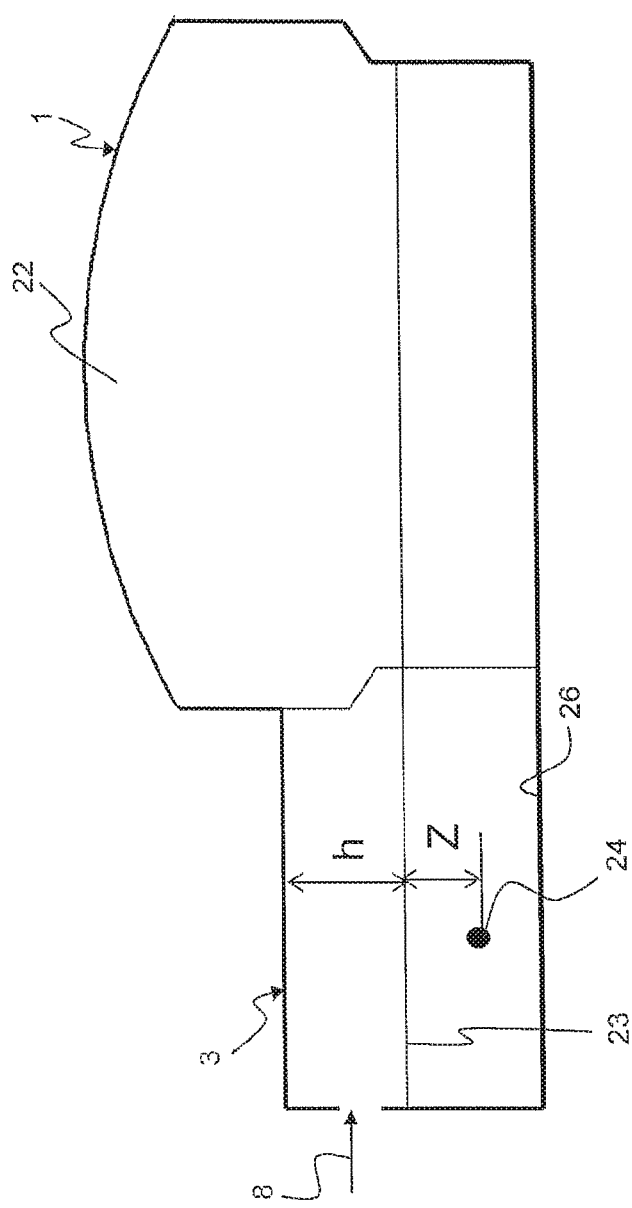

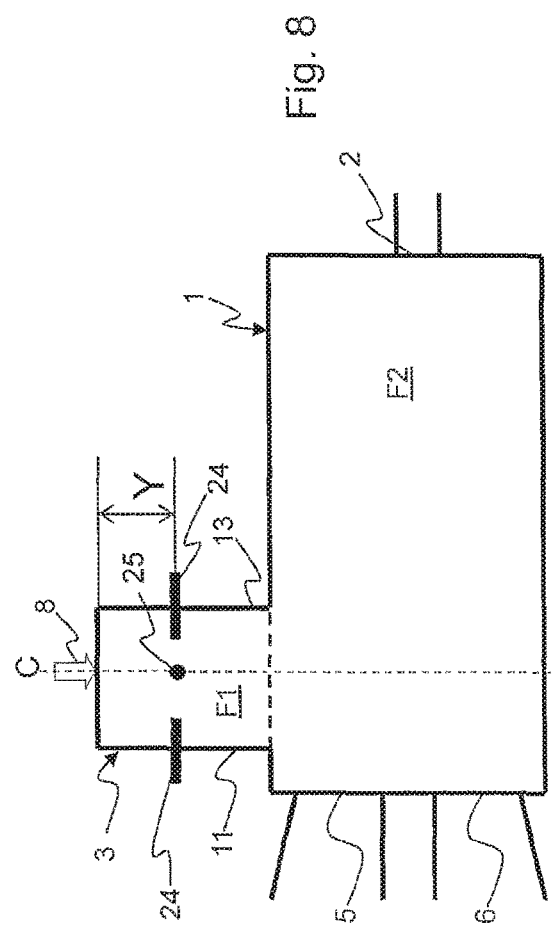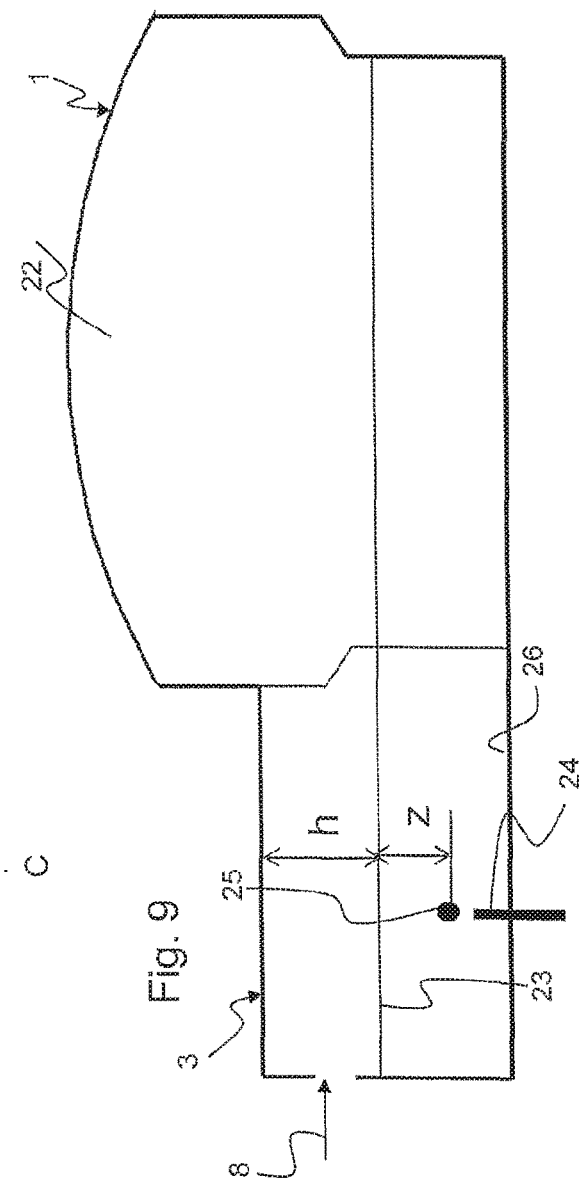

GLASS MELTING PLANT

CROSS-REFERENCES TO RELATED APPLICATIONS

This application claims the benefit of the German patent application No. 10 2015 106 455.3 filed on Apr. 27, 2015, and German patent application No. 10 2015 108 195.4 filed on May 22, 2015, the entire disclosures of which are incorporated herein by way of reference.

BACKGROUND OF THE INVENTION

The present invention relates to a glass melting plant having a melting tank having end-fired heating, having side walls and a floor, and the melting tank having a melt surface of at least 40 $m^2$. The melting plant is fed from one side, via a doghouse having a feeding device.

The melting tank standardly has an inlet for supplying the feed material charge, a preferably channel-shaped outlet for removing the molten glass, the inlet of the melting tank being connected to the doghouse and the doghouse having a roof that has an end wall facing the feeding device, the end wall enclosing, together with the roof, a gas compartment that is open toward the melting tank. The surface of a conventional doghouse is, as a rule, between 1.5 $m^2$ and 3.5 $m^2$. At the end situated opposite the inlet of the melting tank, the doghouse moreover has an opening in the end wall that is used to input the charge.

The glass melting process is an energy-intensive industrial manufacturing process. Therefore, a great deal of effort is made to reduce the energy required per ton of glass produced. The manufacturing of so-called soda-lime-silica glass provides an example of the high energy outlay. This group of a large number of glass compounds is used for 80% of glass production worldwide. It is the basis for the production of container glass and flat glass. Fossil fuels are predominantly used as the energy source for this process. These fuels are brought to exothermic reaction using either air or oxygen as an oxidant. The released energy is transferred to the melt bath, or to the raw material mixture (batch) placed onto the melt bath. In the melt process, a large portion of the energy is required to convert the raw material mixture into a liquid melt. This process is endothermic. Approximately 35% of the energy required for the melting and heating to the required process temperature is required for the chemical conversion. If the energy is added that is required to heat the mixture to the reaction temperature, this energy portion is over 60% of the total energy transferred to the melt bath.

For the continuous production of the glass melt in larger quantities, tank technology has predominated since the end of the 19th century. Here, the raw material mixture is continuously introduced in dosed fashion into a melting tank having a specified depth. Above the melting tank there is situated a combustion chamber in which fossil fuel is combusted with addition of an oxidant. Here the exhaust gas can be used to preheat the oxidant. The melting tank has a channel-shaped outlet or flue from which the completely melted and refined glass is supplied to manufacture.

Over time, the technical realization of glass melting plants has constantly been improved. This has had to do essentially with the demands made on quality, the lengthening of the lifespan of the melting plants, the reduction of investment costs, and the reduction of emissions. A large part of the investments also went towards reducing energy consumption. Calculated over its entire useful life, the energy costs of a glass melting plant are a multiple of the investment sum for the glass melting plant itself. Consequently, increasing energy costs provide, especially today, an essential economic argument for the significant efforts made to reduce energy consumption.

However, these developments quickly run up against technological limits. A theoretical boundary value can be defined as follows (see Conradt, "Comparative Analysis of the Performance of Industrial Glass Melting Furnaces," in DGG GOMD Conference, Aachen 2014, Advances in Fusion and Processing of Glass).

Given a pure glass melt of a raw batch for a soda-lime-silica glass, and a standard exit temperature of the glass melt from the melting plant of 1200° C., a specific energy consumption of 2.1 GJ/t is to be reckoned with. This amount includes only the chemical conversion and the heating to the process temperature without any losses. This energy requirement can be slightly influenced through modification and treatment of the raw material mixture.

In practice, the theoretical energy consumption increases significantly in particular due to three additional sources of heat loss: heat losses through the walls of the melting plant, heat losses due to the conducting of the hot combustion gases out of the melting plant, and heat losses due to the heat content of the melt flow itself leaving the melting plant towards the processing. Despite all technological improvements, in the currently existing art a specific energy consumption of more than 4 GJ/t is standard. The ability to influence the named heat sinks with the goal of lowering the energy requirement is possible only within limits. Possible measures are:

- The portion of raw material mixture can be replaced by recycled shards, depending on availability, up to more than 90%. This significantly reduces the energy requirement for the chemical conversion of the raw material mixture.
- The melt energy requirement can also be reduced by improving the heat conductivity of the raw materials. This is done through pelleting, a solution that however requires a large outlay and is expensive due to the necessary comminution of the raw materials and thermal treatment.
- The energy consumption can also be improved to a limited extent by modifying the composition of the components. Working against this, however, are further technical facts that increase the energy consumption.

Additional energy is required to give a not insignificant volume of the glass melt in the continuous process the dwell time needed in order to remove solid or gaseous relicts. Solid relicts are residues of the less soluble raw material mixture, and gaseous relicts are bubbles that result from the decomposition process of the raw materials. Due to the comparatively high viscosity, even at a high process temperature, this outlay is considerable. Above their melting point, metal melts have the viscosity of water. In such melts, bubbles rise in a short time. In the glass melt, this rise speed is slower by orders of magnitude. The melt vessel therefore has to be made correspondingly large.

The heat losses through the walls of the melting tank mentioned above are proportional to the surface of the glass melting plant. Over the course of decades, the wall design of melting tanks has constantly improved, and in addition new materials have been developed in order to minimize these losses.

An important heat sink is the heat content of the combustion gases. The size of the combustion chamber is designed such that the dwell time of the combustion gases is as long as possible, and the volume or surface of the combustion chamber is kept low due to the wall losses. The heat in the exhaust gas is as a rule used to preheat the combustion air. This heat exchanger process is however physically limited in its effectiveness.

Finally, as a further essential heat sink there remains the glass melt itself, which leaves the melting tank and is conducted through a channel system for processing. The processing temperature is as a rule at least 200° C. below the exit temperature from the melting tank. A correspondingly high cooling power again has the consequence of an unnecessary heat loss. Efforts are therefore made to keep the temperature of the melt flow from the melting tank as low as possible.

All approaches to the improvement of the energetic efficiency have in common the reduction of the size of the melting tank. The evaluation of the energy consumption and melting performance of numerous melting plants shows a significant association. The reduction of the size of the melting tank goes together with a reduction of the wall surface and wall losses, assuming good insulation of the walls. However, the reduction of the size of the melting tank causes a reduction of the quantity of glass that can be produced. A specific load (specific melting performance) of a melting plant of approximately 3.5 t/m2d can be achieved today under particular advantageous technical melt conditions. It is desirable to increase the throughput of a glass melting plant, and correspondingly the specific melting performance, with glass quality that at least remains the same, while here the energy consumption should continue to be kept minimal.

The melt surface is the critical measure for the energetic optimization of a glass melting plant. Conventional melting plants have a melt surface between 30 m$^2$ and 200 m$^2$.

In the melting tank, the still-unmelted raw material mixture coming from the doghouse floats on the melt surface. Here, the coverage should be uniform and spread as thin as possible. The raw material mixture is distinguished, in the still-unmelted state, by very low heat conductivity, and, as a loose heap, has a comparatively high porosity. This further reduces the heat conduction. A heat conductivity of the batch of approximately 1 W/mK is usually assumed. This is lower by more than a factor of 10 compared to the thermal conductivity of the glass melt, differing depending on the color and transmission. The transfer of heat to the batch covering is therefore very limited, and is the reason for seeking to make the covering as thin as possible. All attempts to accelerate the melting of the raw material have in common that the energy density is intensified either over the raw material covering or underneath.

From EP 0 137 881 B1 and U.S. Pat. No. 4,381,934, it is known that the energy input to the raw material stream takes place exclusively from above, via radiation. Here the raw material forms an inclined flow plane from which melting off takes place. In EP 1 904 408 B1, the energy input takes place via burners that are directed onto the melt bath from above. However, these technical teachings have a plurality of disadvantages: the direct burner impulse, in contact with the still-unmelted raw material, causes significant formation of dust. More easily melted components detach from the overall mixture. The melt becomes non-homogenous. The high energy density, caused by the direct burner contact with the raw materials, can cause significant vaporization of the components with high vapor pressure (for example alkalis). Here as well, non-homogeneity of the glass melt is to be expected.

In Glastechn. Ber. 59 (1986) 10, pp. 279-291, Ungan describes the physical limits of the transmission of energy to the unmelted batch. According to this reference, the raw material mixture floating on the glass melt absorbs, approximately in equal portions, the energy via the radiation in the combustion chamber and through heat conduction via the melt from below. The best possible efficiency of the melting off of the raw material mixture can take place only if both energy streams are available. Only this makes it possible to reduce the melt surface necessary for the spreading of the batch. For the energy input underneath the floating batch, it is necessary that in the melting container surfaces are also available that are open and not covered by batch. Only then can the melt absorb the energy and, carried by the density convection, transport the energy under the batch covering. A significant enlargement of the melting tank, necessary for the application of this principle in order to obtain more surface not covered by batch, is however very expensive technically and financially.

SUMMARY OF THE INVENTION

Therefore, the object of the present invention is to fashion a glass melting tank of the type named above in such a way that the specific melting performance is increased with glass quality remaining at least the same, the energy consumption continuing to remain minimal.

According to the present invention, this object is achieved in that the feeding surface of the doghouse is at least 8 m$^2$ and, given a melt surface greater than or equal to 115 m$^2$, is at least 7% of the melt surface of the melting tank. Advantageously, the feeding surface is at most 25% of the melt surface of the melting tank. At the indicated size of the feeding surface, on the one hand a high specific melting performance is achieved, and on the other hand the melt bath surface is free of the raw material covering to such an extent that energy can enter adequately into the glass melt. This is achieved through the significant enlargement of the doghouse according to the present invention. The radiation into the doghouse permits a conditioned energy input from above onto the charge. Due to the enlarged doghouse, the covering of the melt bath surface in the melting tank is reduced relative to the glass throughput. In this way, adequate free surface is available, making it possible to transport the energy input into the glass melt and, finally, under the batch covering.

Particularly good results can be achieved with regard to the specific melting performance, which can be increased up to 5 t/m2d, if the feeding surface of the doghouse, given a melt surface greater than or equal to 90 m$^2$, is at least 9% of the melt surface of the melting tank (advantageously at most 20% of the melt surface of the melting tank). Preferably, the feeding surface of the doghouse, given a melt surface greater than or equal to 80 m$^2$, is at least 10% of the melt surface of the melting tank (advantageously at most 18% of the melt surface of the melting tank).

The feeding surface can have a rectangular shape or any other shape, for example a trapezoidal shape, the shape of an asymmetrical trapezoid, or a hexagonal shape. The doghouse, and thus the feeding surface that is the base surface of the doghouse, is limited by the end wall of the doghouse with the opening for the feeding of the charge at the one end in the direction of transport of the charge, the side having direct connection to the melting tank at the end of the doghouse situated opposite, in the direction of transport, and the at least two side walls, which are configured either parallel or non-parallel to one another, depending on the shape of the base surface or feeding surface of the doghouse. Here, the feeding surface extends parallel to the surface of the molten glass in the glass melting plant.

The size according to the present invention of the feeding surface of the doghouse proves advantageous, in particular for glass melting plants having a melt surface (the feeding surface is not counted as part of the melt surface) of at least 40 m$^2$ and at most 200 m$^2$.

The doghouse and the melting tank are aggregates according to the present invention that accommodate the glass material. The surface of the glass material situated in the melting tank and in the doghouse is covered at least partly with batch, the surface of the glass material in the doghouse being covered for the most part with batch that is not yet melted.

According to a preferred specific embodiment of the present invention, the apex, i.e., the highest line of the roof of the doghouse, has a distance h from the block edge (i.e., the tank block upper edge or upper edge of the rise of the crown) of the doghouse of at least 400 mm, preferably at least 500 mm. In this way, the introduction of radiated energy into the doghouse is supported, thus achieving a reduction of energy consumption.

It has further turned out to be advantageous that the doghouse is equipped with an electrical resistance heating unit having at least one electrode. Here, one electrode, or two or more electrodes, can be situated in the doghouse, and, if warranted, an electrode can be situated in the area of the melting tank. An alternating voltage is applied to the electrodes. The electrodes have different potentials. The current is conducted via the movable charge bearers, preferably the alkali oxides in the melt. The conduction produces an internal friction in the melt. This frictional heat, so-called Joule heat, finally causes the increase of temperature in the melt. This heat transmission is significantly more efficient compared to the transmission through radiation or fossil-based heating. Except for the power loss, the electrical power is transmitted completely to the melt in the area of the doghouse. The present invention therefore combines fully electrical heating in the area of the doghouse with fossil-based melt technology in the area of the melting tank. This is possible in particular also due to the fact that the feeding surface of the doghouse has been enlarged. The melting off in the area of the doghouse is significantly accelerated, while the area of the fossil-based heating, relative to the glass throughput, can be reduced in size. Therefore, through this measure the specific melting performance can be further increased.

The inventor has meritoriously recognized that through the use of an electrical additional heating unit in a doghouse, freezing of the melt at the floor can be avoided. The additional use of an electrical heating unit is at first more expensive, but this expense is more than compensated by the significantly increased specific melting performance. It was further recognized that the known disadvantages of a fully electric heating of the melt, which are that fluctuations in the loading of the plants quickly cause changes in the surface coverage of the melt with charge, causing heat loss and therefore energy loss, and that the dwell time of the melt in the melt vessel is frequently comparatively low, have less critical effects in a small doghouse (compared to the melting tank), and instead, due to the situation of the electrodes, a supply of energy can be realized at the required location of the glass melting plant. Through the measure according to the present invention, the glass quality can be improved.

In a preferred exemplary embodiment, at least two electrodes extend laterally into the melt, each two laterally inward-extending electrodes being situated opposite one another and forming an electrode pair. The advantage of the lateral configuration of the electrodes is that, due to their position, they cannot react or form an alloy with metallic impurities introduced into the melt for example by foreign shards. The metallic impurities sink to the floor of the doghouse due to their high density.

In addition, it has turned out to be advantageous that at least one electrode of the at least two electrodes extends into the melt from the floor of the doghouse, transverse to the direction of transport of the charge in the doghouse, and forms a floor electrode, each floor electrode preferably being assigned to an electrode pair protruding laterally into the melt, and being situated at the same distance Y from the end wall of the doghouse. Here, the floor electrode is preferably placed approximately centrically between the front ends of the lateral electrodes. This specific embodiment is advantageous in particular if a good separation of the recycled shards from metallic impurities is present. In the preferred exemplary embodiment having a laterally situated pair of electrodes and a floor electrode, the specific loading of the individual electrodes (in A/cm2) can advantageously be reduced, which prolongs the useful life of the respective electrode.

In a development of the present invention, the at least two electrodes extend into the glass melt with a front segment X, the length of segment X being at least 200 mm, preferably at least 400 mm, and/or preferably at most 1200 mm. Here, the at least two electrodes extend into the melt transverse to the direction of transport of the charge in the doghouse. Also in this specific embodiment, by lengthening the segment extending into the glass melt the load of the electrode is reduced, and the useful life is correspondingly prolonged.

For the same reason, the use of a multiplicity of electrodes is advantageous, a further laterally situated electrode pair and/or a further floor electrode having a distance Y2 from a laterally situated electrode pair adjacent to the end wall of the doghouse, and/or from a floor electrode adjacent to the end wall of the doghouse, which distance is at least 200 mm, preferably at least 400 mm, and/or preferably at most 2000 mm. Distance Y2 is also measured parallel to the direction of transport of the charge in the doghouse.

In a further exemplary embodiment, the at least two electrodes adjacent to the end wall have a distance Y from the end wall that is at least 400 mm, preferably at least 700 mm, and/or preferably at most 2000 mm. The distance Y is measured parallel to the direction of transport of the charge in the doghouse. The indicated distance of the electrodes from the end wall is therefore advantageous, because these are then situated in a region of the melt that has a higher temperature. There, the melt has a higher electrical conductivity due to the higher temperature. Consequently, the electrodes can produce more Joule heat there.

It is further advantageous if each laterally inward-extending electrode pair has a distance Z from the block edge of the doghouse that is at least 200 mm, preferably at least 400 mm, and/or preferably at most 800 mm. The distance Z is measured in the direction of the floor of the doghouse, starting from the block edge of the doghouse. The advantage of this specific embodiment results from the fact that in this configuration the electrodes are situated in the core region of the flow, and at a sufficient distance from the melt material covering. Here as well, the electrical conductivity of the melt is advantageous for heating the melt material. In addition, at this distance from the block edge the electrodes are also situated at an adequate distance from the unmelted melt material, so that reactions of the electrode material with this material flow can be avoided.

Alternatively or in addition, the melt in the doghouse can also be heated with at least one burner immersed in the melt from the floor, operating with any type of fuel, in particular combustible gases. This heating technology causes the formation of bubbles, but can be used in the present case because after the doghouse there follows a melting tank which makes it possible for such bubbles to be removed.

BRIEF DESCRIPTION OF THE DRAWINGS

In the following, the present invention is explained in more detail on the basis of exemplary embodiments shown in the Figures.

FIG. 1 shows, in a top view, a melting tank having end-fired heating, having a doghouse of a first exemplary embodiment of a glass melting plant according to the present invention, FIG. 2 shows a section through the doghouse and the melting tank along the sectional plane A-A of the exemplary embodiment shown in FIG. 1, FIGS. 3 and 4 show a comparison of the coverage of the surface of the melt in the melting tank of a melting plant according to the present invention having a large feeding surface of the doghouse with a throughput performance of 300 t/d (FIG. 3) and having a conventional feeding surface of the doghouse with a throughput performance of 150 t/d (FIG. 4);

FIG. 5 shows a second exemplary embodiment of a glass melting plant according to the present invention, in a top view, FIG. 6 shows the second exemplary embodiment of the glass melting plant according to FIG. 5 in a section along the sectional plane B-B, FIG. 8 shows a fourth exemplary embodiment of a glass melting plant according to the present invention, in a top view, FIG. 9 shows the fourth exemplary embodiment of a glass melting plant according to the present invention according to FIG. 8, in a section along the plane C-C.

DETAILED DESCRIPTION OF THE PREFERRED EMBODIMENTS

Figure 7:
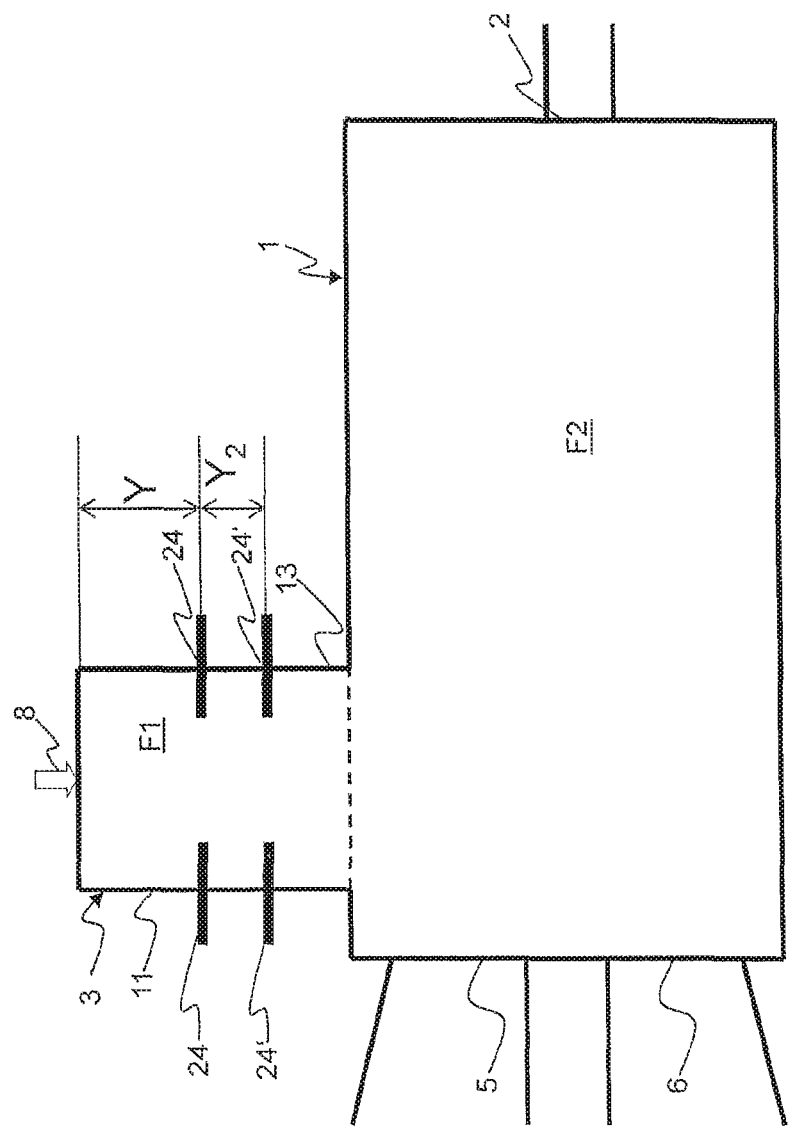
FIG. 7 shows a third exemplary embodiment of a glass melting plant according to the present invention, in a top view.

FIG. 1 shows a melting tank 1 of a glass melting plant (not shown in more detail) of the end-fired type, on whose one side wall 14 there is situated a doghouse 3. The doghouse 3 ends at an inlet 4 of the melting tank 1, and there opens into the melting tank 1. At the left side of FIG. 1, i.e., at a side wall 17 of the melting tank 1, burner ports 5, 6 are indicated of the two burners situated alongside one another, with the supply of the oxidant and of fuel. Connected to these, for regenerative heat recuperation, are two chambers (also not shown) of a regenerator. At a side wall 15, which is situated opposite the side wall 17 with the burner ports 5, 6, there is situated a preferably channel-shaped outlet 2 of melting tank 1, which is used for the removal of the glass melt.

The glass melting plant is continuously fed with unmelted charge material 7. Here, the charge 7 is supplied to the doghouse 3 via a feeding device (not shown). This is indicated by arrow 8. From there, the charge 7 is pushed onto a glass melt 9. As long as the charge 7 has not yet completely melted, it floats on the glass melt 9, whose surface is indicated by a broken line in FIG. 2, and is heated from above via heat or flame radiation in a burner compartment or chamber 22, and at the same time from below by the glass melt 9 through heat conduction. The heat conduction of the covering through the batch 7 is very limited. It is less than 1 W/mK. The heat conductivity of the glass melt 9 is, in contrast, an order of magnitude higher, i.e., greater than 10 W/mK.

The doghouse 3 is limited by side walls 11, 12, 13 and an outlet 4, which form a feeding surface F1 parallel to the direction of transport of the charge. In addition, the doghouse 3 has a floor 26. The (partly melted) glass melt 9 is situated in a basin that ends at a block edge (basin upper edge) 23.

The melt (tank) surface F2 is defined as the base surface of the burner chamber 22 in the region of the melt tank basin, limited by the side walls 14 through 17.

The doghouse 3 has previously been kept small relative to the melt surface F2. The covering of the glass melt 9 with the charge 7 is now reduced in that the doghouse 3 is made significantly and relatively larger. The feeding surface F1 of the doghouse 3 is, according to the present invention, at least 8 $m^2$, and, given a melt surface F2 greater than or equal to 115 $m^2$, is at least 7% of the melt surface F2, and, given a melt surface F2 greater than or equal to 90 $m^2$, is preferably at least 9% of the melt surface F2, and, given a melt surface F2 greater than or equal to 80 $m^2$, is particularly preferably at least 10% of the melt surface F2. It is advantageous if the feeding surface of the doghouse is at most 25% of the melt surface F2, preferably at most 20%, particularly preferably at most 18% of the melt surface F2.

In conventional glass melting plants, the boundary of the specific load is, for example, greater than 3.5 t/m2*d, and the specific energy consumption, given an addition of shards of >70%, is approximately 960 kWh/t glass (3450 kJ/t).

Modeling calculations have shown that, with the enlargement according to the present invention of the doghouse 3, an increase of the specific melting performance to >5 t/m2*d is possible. In this way, relative to 50% shard additive in the calculation example, the energy consumption can be reduced to 3.3 GJ/t glass.

Such a model calculation is shown in FIGS. 3 and 4. In both cases, the melting plant has a melt surface of melting tank 1, 1' of, in each case, 60 $m^2$. The feeding surface of the doghouse 3, 3' is standardly not counted as part of the melt surface. The hexagonal feeding surface of the doghouse 3 of the melting plant according to the present invention shown in FIG. 3 is 9 $m^2$, while the feeding surface of a doghouse 3' of the conventional melting plant shown in FIG. 4 is 2.2 $m^2$.

The melting performance of the melting plant shown in FIG. 3 is 300 t/d, while the melting performance of the conventional melting plant, shown in FIG. 4, is only 150 t/d.

The not yet melted charge 7 that floats on the melt bath is represented in FIGS. 3 and 4 by trajectories. The free surface 25, 25' of the melt bath, not covered by melt material, is shown by hatching. It can easily be seen that despite the doubling of the melting performance of the melting plant shown in FIG. 3 having a larger doghouse 3, the free surface 25 is approximately equally large relative to the free surface 25' in FIG. 4 in the melting plant with the smaller doghouse 3' and with significantly lower loading. The free surface 25, 25' is substantially responsible for the fact that radiation energy from the firing chamber can penetrate into the melt 9 via the melt surface. The radiation energy penetrates into the glass bath via the free surface, and the melt heated in this way flows, due to density convection, back into the region of the melt material feeding. The hot melt flow promotes the melting off of the melt material underneath the melt material covering.

The doghouse 3 shown in FIGS. 1 and 2 has a roof 18 that has an end wall 20 oriented towards the feeding device, which wall encloses, with the roof 18, a gas compartment 21. The apex of the roof 18 in the gas compartment 21 has a distance h from the block edge 23 of the doghouse 3 of at least 400 mm, preferably at least 500 mm. This is intended to promote the supply of energy through radiation and/or flame gases in the region of the doghouse.

The doghouse 3 can be equipped with an additional electrical resistance heating unit. Examples of this are explained in the following on the basis of FIGS. 5 through 10. The design of the glass melting plants shown in FIGS. 5 through 10 corresponds to that of the first exemplary embodiment shown in FIGS. 1 and 2, except for the electrodes for electrical heating.

The exemplary embodiment shown in FIGS. 5 and 6 has two electrodes 24 in the region of the doghouse 3, which extend into the melt laterally (i.e., transverse to the direction of transport of the charge) from the side walls 11 or 13. The two electrodes 24 are situated opposite one another, and form an electrode pair.

The electrodes 24 extend into the melt with a front segment having a length X (length measured from side wall 11 or 13). The length X of the segment is at least 200 mm, preferably at least 400 mm, and/or preferably at most 1200 mm.

In addition, the electrodes 24 have a distance Y from the end wall 20 of the doghouse 3. The distance Y is measured parallel to the direction of transport of the charge. The distance Y from the end wall is at least 400 mm, preferably at least 700 mm, and/or preferably at most 2000 mm.

In addition, the electrodes 24 are situated at a distance Z (cf. FIG. 6) from the block edge 23 of the doghouse 3 that is at least 200 mm, preferably at least 400 mm, and/or preferably at most 800 mm. The distance Z is measured in the direction of the floor 26 of the doghouse 3, starting from the block edge 23 of the doghouse 3.

The exemplary embodiment shown in FIG. 7 has a further laterally situated pair of electrodes 24'. These are situated at a distance Y2 from the first electrode pair 24 that is at least 200 mm, preferably at least 400 mm, and/or preferably at most 2000 mm. The distance Y2 is also measured, analogous to the distance Y, parallel to the direction of transport of the charge in the doghouse 3.

In comparison with the exemplary embodiment shown in FIGS. 5 and 6, the exemplary embodiment of FIGS. 8 and 9 has a further floor electrode 25 that is situated approximately centrally between the two lateral electrodes 24 in the floor 26 of the doghouse 3, and extends into the melt oriented upward, also transverse to the direction of transport of the charge in the doghouse 3. The floor electrode 25 has the same distance Y from the end wall 20 as do lateral the electrodes 24.

Figure 10:
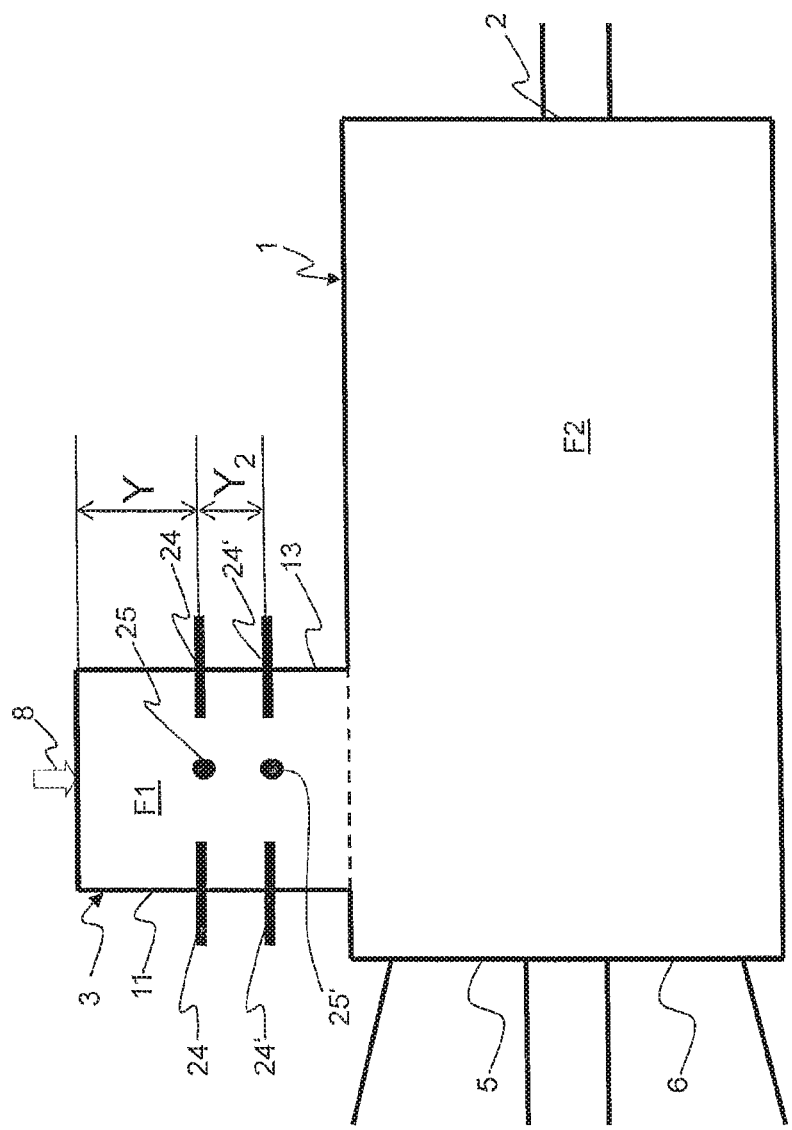
FIG. 10 shows a fifth exemplary embodiment of a glass melting plant according to the present invention, in a top view.

The further exemplary embodiment shown in FIG. 10 of a glass melting plant according to the present invention is a combination of the exemplary embodiments according to FIG. 7 and FIGS. 8/9, with regard to the configuration of the electrodes. It has two pairs of lateral electrodes 24, 24', and a respective floor electrode 25, 25' that is assigned to a pair of lateral electrodes 24, 24'.

Alternatively, or in addition, as illustrated in FIG. 2, the melt 9 in the doghouse 3 can also be heated with at least one burner 28 immersed in the melt from the floor 26, operating with any type of fuel, in particular, combustible gases. This heating technology causes the formation of bubbles, but can be used in the present case because after the doghouse 3 there follows a melting tank 1 which makes it possible for such bubbles to be removed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1, 1' melting tank
2 outlet
3, 3' doghouse
4 inlet of melting tank 1
5 burner port
6 burner port
7 feeding material (charge, not melted)
8, 8' arrow (identifies the supply of feeding material by a feeding device)
9 glass melt
11 side wall of doghouse 3
12 side wall of doghouse 3
13 side wall of doghouse 3
14 side wall of melting tank 1
15 side wall of melting tank 1
16 side wall of melting tank 1
17 side wall of melting tank 1
18 roof
20 end wall of doghouse 3
21 gas compartment
22 burner compartment/chamber
23 block edge (basin upper edge) of doghouse 3
24, 24' electrode
25, 25' floor electrode
26 floor of doghouse 3
27, 27' free surface without batch covering
28 burner port
F1 feeding surface
F2 melt surface

The invention claimed is:

1. A glass melting plant comprising:
a melting tank having a width defined by two spaced apart end walls and a length defined by two spaced apart side walls, and end-fired heating provided by burners arranged in one of the end walls,
the melting tank having an inlet for supplying feeding material, an outlet for removing molten glass, the inlet being arranged in a vicinity of the end wall with the burners and the outlet being arranged in a vicinity of the opposite end wall, and a melt surface area in the melting tank of at least 40 m$^2$ and not greater than 200 m$^2$,
only one doghouse, the doghouse being laterally situated along one of the side walls and being connected to the inlet of the melting tank for the input of the feeding material, the doghouse having side walls that, together with the inlet of the melting tank, limit a feeding surface, and a feeding device, the doghouse having a roof that has an end wall oriented toward the feeding device, which end wall encloses, with the roof, a gas compartment that is open toward the melting tank, the feeding surface of the doghouse comprising an area of at least 8 m² and, in case said melt surface area is greater than or equal to 115 m², the feeding surface of the doghouse comprises an area of at least 7% and at most 25% of said melt surface area of the melting tank.

2. The glass melting plant as recited in claim 1, wherein the feeding surface area of the doghouse is, in case said melt surface area is greater than or equal to 90 m², at least 9% of said melt surface area of the melting tank.

3. The glass melting plant as recited in claim 1, wherein the feeding surface of the doghouse is, in case said melt surface area is greater than or equal to 80 m², at least 10% of said melt surface area of the melting tank.

4. The glass melting plant as recited in claim 1, wherein an apex of the roof of the doghouse has a distance from a block edge of the doghouse of at least 400 mm.

5. The glass melting plant as recited in claim 1, wherein an apex of the roof of the doghouse has a distance from a block edge of the doghouse of at least 500 mm.

6. The glass melting plant as recited in claim 1, wherein the doghouse has an electrical resistance heating unit.

7. The glass melting plant as recited in claim 6, wherein the doghouse has at least one electrode for the electrical resistance heating unit.

8. The glass melting plant as recited in claim 1, wherein the doghouse has at least one burner that is immersed in the melt from the floor, for heating.

9. A glass melting plant comprising:

a melting tank having a width defined by two spaced apart end walls and a length defined by two spaced apart side walls, and end-fired heating provided by burners arranged in one of the end walls, the melting tank having an inlet for supplying feeding material, an outlet for removing molten glass, the inlet being arranged in a vicinity of the end wall with the burners and the outlet being arranged in a vicinity of the opposite end wall, and a melt surface area in the melting tank of at least 40 m² and not greater than 200 m², only one doghouse, the doghouse being laterally situated along one of the side walls and being connected to the inlet of the melting tank for the input of the feeding material, the doghouse having side walls that, together with the inlet of the melting tank, limit a feeding surface, and a feeding device, the doghouse having a roof that has an end wall oriented toward the feeding device, which end wall encloses, with the roof, a gas compartment that is open toward the melting tank, the feeding surface of the doghouse comprising an area of at least 8 m² and, in case said melt surface area is greater than or equal to 115 m², the feeding surface of the doghouse comprises an area of at least 7% and at most 25% of said melt surface area of the melting tank, the doghouse having an electrical heating resistance unit, wherein the electrical heating resistance unit comprises at least two electrodes which extend solely into the doghouse and transverse to a direction of transport of the charge, the two electrodes extending from opposite walls of the doghouse a same distance from the end wall and in line with and towards each other, but without touching each other.

10. The glass melting plant as recited in claim 9, wherein the at least two electrodes form an electrode pair.

11. The glass melting plant as recited in claim 10, wherein at least one additional electrode extends from a floor of the doghouse into the melt, and forms a floor electrode, and each floor electrode is assigned to an electrode pair extending laterally into the melt, and is situated at the same distance from the end wall as the electrode pair.

12. The glass melting plant as recited in claim 10, wherein a further laterally situated electrode pair has a distance that is at least 200 mm from a laterally situated electrode pair adjacent to the end wall of the doghouse.

13. The glass melting plant as recited in claim 9, wherein at least one additional electrode extends from a floor of the doghouse into the melt, and forms a floor electrode.

14. The glass melting plant as recited in claim 13, wherein a further laterally situated floor electrode has a distance that is at least 200 mm from a laterally situated floor electrode adjacent to the end wall of the doghouse.

15. The glass melting plant as recited in claim 9, wherein the at least two electrodes extend with a front segment into the glass melt completely within the doghouse, the length of the segment being at least 200 mm.

16. The glass melting plant as recited in claim 9, wherein the at least two electrodes adjacent to the end wall have a distance from the end wall of the doghouse that is at least 400 mm.

17. The glass melting plant as recited in claim 9, wherein the at least two electrodes adjacent to the end wall have a distance from the end wall of the doghouse that is at least 700 mm.

18. The glass melting plant as recited in claim 9, wherein each laterally inward-extending electrode pair has a distance from the block edge of the doghouse that is at least 200 mm.

19. The glass melting plant as recited in claim 9, wherein the at least two electrodes extend with a front segment into the glass melt, the length of the segment being at least 400 mm.

20. A glass melting plant comprising:

a melting tank having end-fired heating, the melting tank having an inlet for supplying feeding material, an outlet for removing molten glass, and a melt surface area of at least 40 m², at least one doghouse laterally situated and being connected to the inlet of the melting tank for the input of the feeding material, the doghouse having side walls that, together with the inlet of the melting tank, limit a feeding surface, and a feeding device, the doghouse having a roof and an end wall oriented toward the feeding device, which end wall encloses, with the roof, a gas compartment that is open toward the melting tank, the feeding surface area of the doghouse comprising at least 8 m² and, in case said melt surface area is greater than or equal to 90 m², the feeding surface of the doghouse comprises an area of at least 9% of said melt surface area of the melting tank.

* * * * *